United States Patent
Gray et al.

(10) Patent No.: US 7,978,613 B2
(45) Date of Patent: Jul. 12, 2011

(54) TEST SIGNALLING

(75) Inventors: Philip Gray, Ipswich (GB); Michael P Hollier, Ipswich (GB); Richard JB Reynolds, Ipswich (GB); Antony W Rix, Cambridge (GB)

(73) Assignee: British Telecommunications public limited company (GB)

( * ) Notice: Subject to any disclaimer, the term of this patent is extended or adjusted under 35 U.S.C. 154(b) by 1359 days.

(21) Appl. No.: 10/275,475

(22) PCT Filed: May 10, 2001

(86) PCT No.: PCT/GB01/02050
§ 371 (c)(1),
(2), (4) Date: Nov. 6, 2002

(87) PCT Pub. No.: WO01/93470
PCT Pub. Date: Dec. 6, 2001

(65) Prior Publication Data
US 2003/0092394 A1    May 15, 2003

(30) Foreign Application Priority Data

May 26, 2000  (EP) .................................... 00304497

(51) Int. Cl.
*H04J 3/14*   (2006.01)
*H04M 3/26*   (2006.01)
*H04B 17/00*  (2006.01)
*G10L 15/20*  (2006.01)
*G01R 31/00*  (2006.01)

(52) U.S. Cl. ..................... 370/241; 370/248; 379/27.03; 455/67.13; 455/67.14; 455/423; 704/246; 714/712

(58) Field of Classification Search ................. 370/242, 370/249, 252, 328, 352, 241, 248; 379/27.03; 455/67.13, 67.14, 423; 704/246; 714/712
See application file for complete search history.

(56) References Cited

U.S. PATENT DOCUMENTS

| | | | |
|---|---|---|---|
| 4,149,038 A * | 4/1979 | Pitroda et al. ................. 370/244 |
| 4,234,253 A * | 11/1980 | Higginbotham et al. .... 356/73.1 |
| 4,317,206 A * | 2/1982 | Nossen ......................... 375/224 |
| 4,501,000 A * | 2/1985 | Immink et al. ................ 375/242 |
| 4,528,688 A * | 7/1985 | Ichikawa et al. ............. 704/239 |
| 4,720,802 A * | 1/1988 | Damoulakis et al. ......... 704/233 |
| 5,734,653 A * | 3/1998 | Hiraiwa et al. ............ 370/395.6 |
| 6,246,435 B1 * | 6/2001 | Patel ............................. 348/192 |
| 6,275,797 B1 * | 8/2001 | Randic .......................... 704/233 |
| 6,574,216 B1 * | 6/2003 | Farris et al. .................... 370/352 |
| 6,718,296 B1 * | 4/2004 | Beamond et al. .......... 704/200.1 |
| 6,775,240 B1 * | 8/2004 | Zhang et al. ................... 370/251 |
| 2002/0123343 A1 * | 9/2002 | Wiedeman et al. ........... 455/429 |

OTHER PUBLICATIONS

D.R. Irvin, "Embedding a secondary communication channel transparently within a cyclic redundancy check (CRC)", IBM J. Res & Dev. vol. 45 No. 6 Nov. 2001.*

* cited by examiner

*Primary Examiner* — Alpus H Hsu
(74) *Attorney, Agent, or Firm* — Bourque and Associates (57) ABSTRACT

The degree of degradation imposed on signals transmitted over a communications link from a transmitter to a receiver is tested. A predetermined test signal is transmitted using spare capacity detected by a voice activity detector when no speech is to be transmitted over the communications link. The test signal received by the receiver is compared with the reference signal, and a measure of the degradation of signals caused by the communications link is generated therefrom.

13 Claims, 5 Drawing Sheets

TEST SIGNALLING

BACKGROUND

1. Technical Field

This invention relates to the assessment of the condition of telecommunications systems while in use.

2. Related Art

Signals carried over telecommunications links can undergo considerable transformations such as digitisation, data compression, data reduction, amplification, and so on. Further distortions can be caused by electromagnetic interference from external sources Objective processes for the purpose of measuring the quality of a signal are currently under development and are of application in prototype testing, pre-delivery testing of components, and in-service testing of installed equipment. They are most commonly used in telephony, but are also of application in other systems used for carrying speech signals, for example public-address systems.

The present applicant has a number of patents and applications relating to this technical field, most particularly European Patent 0647375, granted on 14 Oct. 1998. In this invention, two initially identical copies of a test signal are used. A first copy is transmitted over the communications system under test. The resulting signal, which may have been degraded by the system under test, is compared with a reference copy of the same signal, which has not passed through the system under test, to identify audible errors in the degraded signal. These audible errors are assessed to determine their perceptual significance—that is, errors of types which are considered significant by human listeners are given greater weight than are those which are not considered so significant. In particular, inaudible errors are perceptually irrelevant and need not be assessed.

The automated system provides an output comparable to subjective quality measures originally devised for use by human subjects. More specifically, it generates two values, $Y_{LE}$ and $Y_{LQ}$, equivalent to the "Mean Opinion Scores" (MOS) for "listening effort" and "listening quality", which would be given by a panel of human listeners when listening to the same signal. The use of an automated system allows for more consistent assessment than human assessors could achieve, and also allows the use of compressed and simplified test sequences, which give spurious results when used with human assessors because such sequences do not convey intelligible content.

Different errors may have different perceptual significance in different languages, according to the use of different phonemes, and their relative frequencies of occurrence, in each language. Multilingual test sequences are difficult to accommodate in systems using human subjects, as the human subjects would need to be familiar with all the languages represented in the test signal: otherwise spurious results could be caused by any lack of intelligibility to the listener. Automated systems do not have this drawback.

In the patent specification referred to above, an auditory transform of each signal is taken, to emulate the response of the human auditory system (ear and brain) to sound. The degraded signal is then compared with the reference signal in the perceptual domain, in which the subjective quality that would be perceived by a listener using the network is determined from parameters extracted from the transforms.

Such automated systems require a known (reference) signal to be played through a distorting system (the telephone network or other system under test) to derive a degraded signal, which is compared with an undistorted version of the reference signal. Such systems are known as "intrusive" measurement systems, because whilst the test is carried out the system under test cannot carry live (revenue-earning) traffic.

A suitable test signal is disclosed in European Patent Specification 0705501 and comprises a sequence of speech-like sounds, selected to be representative of the different types of phonetic sounds that the system under test may have to handle, presented in a predetermined sequence. The sounds are selected such that typical transitions between individual phonetic elements are represented. Typical speech comprises a sequence of utterances separated by silent periods, as the speaker pauses to breathe, or listens to the other party to the conversation. These silent periods, and the transitions between utterances and silent periods, are also modelled by the test signal.

The arrangement described above requires the use of a pre-arranged test sequence. This means it cannot be used on a live telecommunications link—that is, a link currently in use for revenue-earning traffic. This is because the test sequence would interfere with the traffic being carried and be audible to the users, and because conversely the live traffic itself (whose content cannot be predetermined) would be detected by the test equipment as distortion of the test signal.

In order to carry out tests on equipment in use, without interfering with the signals being carried by the equipment (so-called non-intrusive testing), proposals have been made to use the live speech signals themselves as the test signals. However, a problem with using live speech for this purpose is that there is no instantaneous way of obtaining, at the point of measurement, a copy of the original signal. Any means by which the original signal might be transmitted to the measurement location would be likely to be subject to similar distortions to those generated by the link under test. In test conditions it is, of course, possible to place the transmitter and receiver in close proximity, but this is impossible when testing an in-service long-distance link.

The present Applicant's International Patent applications WO96/06495 and WO96/06496 (both published on 29 Feb. 1996), and WO97/05730 (published 13 Feb. 1997) propose three possible solutions to this problem. WO96/06495 describes the analysis of certain characteristics of speech that are talker-independent, in order to determine how the signal has been modified by the telecommunications link. In WO96/06496, the content of a received signal is analysed by a speech recogniser. The results of this analysis are processed by a speech synthesiser to regenerate a speech signal having no distortions, which is compared with the original signal. WO97/05730 discloses a process in which the received signal is compared with parameters identifying speech-like and non-speech like characteristics, to derive a measurement of the quality of the signal. However, all of these techniques require considerable processing power, making it difficult to monitor signal quality in real time, and the processes all require some assumptions to be made about the incoming signal.

BRIEF SUMMARY

According to an exemplary embodiment of the present invention, there is provided a method of testing the degree of degradation imposed on signals transmitted over a communications link from a transmitter to a receiver, comprising the steps of:

generating a predetermined test signal, identifying spare capacity in which no information content is required to be transmitted over the communications link, in such spare capacity, transmitting at least part of the predetermined test signal over the communications link from the transmitter to the receiver.

At the receiver the following processes may take place:
generating a reference signal at the receiver,
comparing the test signal received by the receiver with the reference signal,
generating therefrom a measure of the degradation of signals caused by the communications link.

In this way the simpler "intrusive" measurement techniques can be used in a non-intrusive manner on a communications channel which is carrying a live call. The invention is primarily intended for use for voice communication systems, in which there are normally gaps in the speech content. Voice activity detectors are common elements of such systems, being used to determine when no transmission is necessary. Typically, when no transmission takes place, a "comfort" noise is generated at the receiving end, to avoid the disconcerting effect on the listener of the complete absence of sound. In the present invention the test signals may be transmitted in the gaps in the speech content detected by the voice activity detector.

Test signals suitable for assessing the perceptual significance of degradation in a speech signal, such as those described in EP0705501, are typically of 15 to 30 seconds duration, which is longer than the typical gaps in speech. Therefore, in one preferred arrangement of the invention, the transmitter transmits a part of the test signal in each such idle period, and the receiver assembles a complete version of the degraded test signal for comparison with the reference signal.

In an alternative arrangement a test sequence shorter than the reference signal is repeatedly transmitted over the communications link in the gaps in speech, and the receiver compares each of the resulting series of degraded copies of the test sequence with an undegraded version of the test sequence, to identify errors in the degraded copies. It then reproduces the said errors in a copy of the reference signal to generate a degraded version of the reference signal, for comparison with an undegraded version of the reference signal. It will be noted that in this embodiment the test sequence is much shorter than the full reference signal. However, it is sufficient to test the path between two intermediate elements, for example the digital path between two codecs, as will be described later, and generate therefrom an indication of the effect of that part of the complete communication path on the perceptual quality of the resulting signal. Note that this part of the path is the one which is most variable, as it includes the switched network, and in particular the air interface, if any.

The test signals may be provided with error checking data which is deliberately "incorrect" such that they can be recognised as test signals by comparing the Hamming distance of the received signal with local copies of the transmitted signal. This also allows the codec in the receiver to disregard them.

As already indicated, it is not generally possible to compare undegraded and degraded versions of live traffic at the receiver, because of the difficulty of simultaneously generating an undegraded version of the signal at the receiving end. However, a third embodiment of the present invention overcomes this difficulty by generating an error-protected version of part of the information-containing part of the transmitter's normal transmissions, for subsequent transmission as the test signal, and the receiver stores the corresponding part of the normal transmission, as received in degraded form, for use as the reference signal for comparison with the be noted that in this case the reference signal is the degraded version and the test signal is the undegraded, error protected, version. The test signal can incorporate a large amount of error protection as it is not transmitted in real time: the end user receives the real-time (degraded) transmission in the usual way.

The result of the evaluation of the link quality can be used for many different purposed. For example, in the GSM adaptive multi-rate speech service, it may be used to assist in selecting the most appropriate AMR speech codec mode or AMR traffic channel (half-rate or full-rate).

Another application of this invention is to build a map of how speech quality varies with geographical location. For this purpose the test signals may also carry reference signals for use in position-finding algorithms used to determine the location of a mobile unit relative to fixed measurement units. By doing this in idle time the hanover process can be avoided.

Apparatus for performing this method is also included in the scope of the invention.

BRIEF DESCRIPTION OF THE DRAWINGS

Embodiments of the invention will now be described, by way of example, with reference to the drawings, in which.

DETAILED DESCRIPTION OF EXEMPLARY EMBODIMENTS

Figure 1:
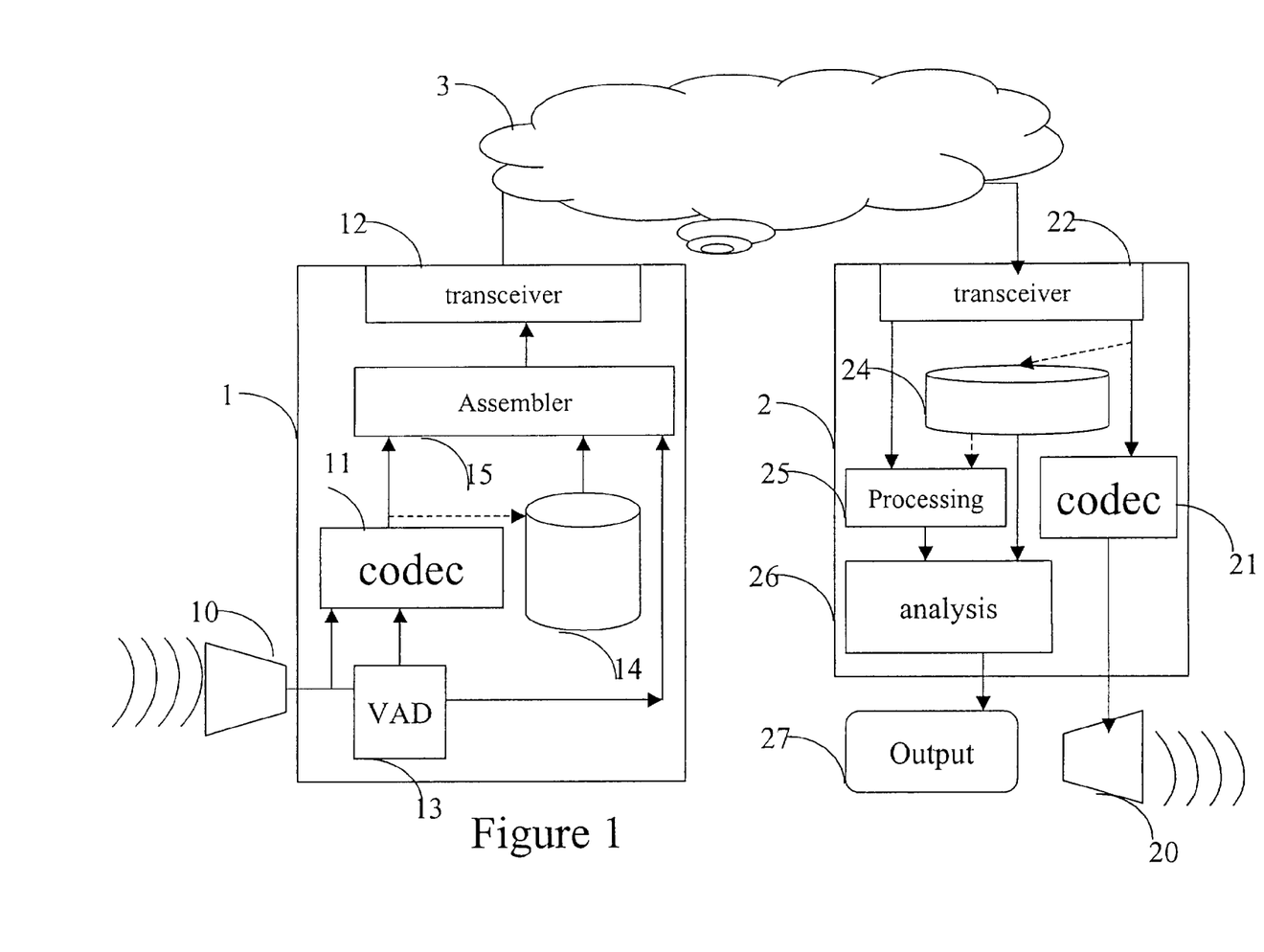
FIG. 1 illustrates diagrammatically a system configured to operate according to the invention.

FIG. 1 illustrates a transmitter 1 and a receiver 2, connected by the communications link 3 that is under test. Typically the transmitter 1 may be a cellular radio telephone, the receiver 2 some point in the fixed part of the cellular telephone network, and the link 3 the communications path in between them, including the radio interface. Note that in this embodiment the system does not test the entire end to end path, in particular the acoustic path (mouth-to-handset, and earpiece-to-ear) and the coding process. For a given test these parts are fixed—this embodiment is primarily concerned with testing the variable part, in particular the intermediate communications path 3, which does vary from one call to another. However, if it is desired to test the entire path, the effects of those stages could be included in the analysis by selecting different points for applying and analyzing the signals. Similarly, a subsystem of the entire path can be analyzed in isolation.

The transmitter 1 includes a microphone 10 for receiving an acoustic signal, which supplies its input to a speech and channel coder (codec) 11 which converts the speech to a digital signal and encodes the resulting bitstream ready for transmission over the link 3. The codec 11 passes its output to an assembler 15 and thence to a transceiver 12 which causes the transmission of the digital data generated by the codec 11 over the link 3.

The incoming acoustic signal is monitored by a voice activity detector 13 to identify non-speech parts of the acoustic signal received from the microphone 10. This can be used to control the transceiver 12, for example by not transmitting during sustained periods of silence. Periodically a special digital code, known as a "comfort noise" indicator, may be transmitted, which indicates the prevailing characteristics of background noise at the transmitter.

The receiver 2 includes a further transceiver 22, which receives the digital data from the link 3 and passes it to a further codec 21 for conversion to an analogue signal for conversion in the telephone earpiece 20 to an acoustic signal. The codec 21 is also configured to generate a "comfort noise" when the special comfort noise indicator is received over the link 3. The comfort noise is generated to avoid the disconcerting effect on the listener of a completely silent earpiece, and reassures the user that the connection has not been lost. The comfort noise indicator controls the level and other characteristics of the comfort noise to be generated at the receiver.

As described so far the system is conventional. The embodiments according to the invention have a number of additional features. In particular, the transmitter 1 has a memory 14 in which data for generation of test signals can be stored. In some embodiments the data is permanently stored in the memory 14, but in others it is extracted from the signal received from the microphone 10. The assembler 15, under the control of the voice activity detector, retrieves the data from the memory 14 and compiles it into test signals for transmission by the transceiver 12 when no signal is to be transmitted from the codec 11.

At the receiving end 2 a memory 24 is provided to store the reference signal In some embodiments the reference signal is stored permanently, but in others it is downloaded to the store from the transceiver 22 for subsequent use. A pre-processor 25 receives the test signal, and uses it to prepare the signal to be used for comparison with the reference signal. The resulting comparison signal is compared with the reference signal retrieved form the store 24 in an analysis unit 26, which transmits an output indicative of the measured signal quality of the link 3 to a display device 27.

Figure 2:
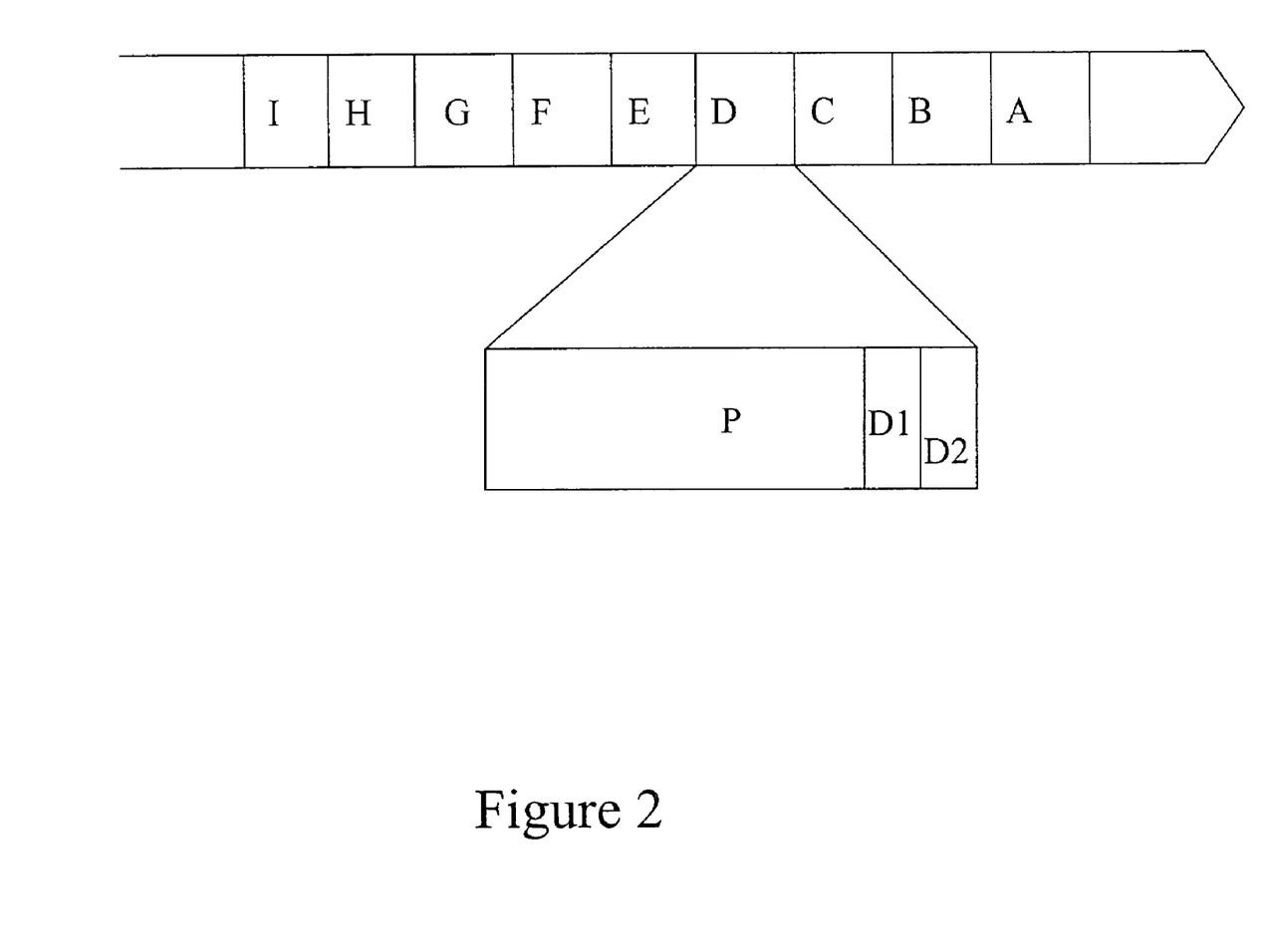
FIG. 2 illustrates diagrammatically the structure of a typical digital data stream.

FIG. 2 illustrates schematically a typical bit stream carried over a digital communications system. The stream is divided into "frames", indicated in FIG. 2 as A, B, C, etc. Each frame is in turn made up of several components, (as shown for frame D). These components may include some control characters D1, D2 (which are shown, for illustrative purposes only, as being the first part of the frame) and a payload P. A typical frame in a cellular telephone system has 456 bits. The control characters may include, among other functions, characterising data D1 indicative of the nature of the payload P (if not incorporated into the payload itself), and error-checking components D2.

The characterising data D1 may, for example, indicate whether or not the payload is a speech signal generated by the codec 11. If, as a result of the voice activity detector 13 detecting a cessation of speech, the payload P is not speech, the characterising data D1 may indicate whether the payload is a comfort noise descriptor, a test signal, or simply null data. The characterising data D1 is used by the transceiver 22 at the receiving end to determine how to process the payload.

The error-checking component D2 provides one or more check digits to detect corruption of the frame. The limited capacity available in a frame for this function only makes it possible to identify whether the frame is corrupt. The receiver 2 may use this information to determine whether such corrupted frames should be disregarded, or merely to monitor the rate at which such errors occur. However, it cannot determine the nature of the degradation, nor its perceptual significance.

Spare payload capacity occurs when the voice activity detector 13 indicates that there is no speech signal to be coded by the codec 11. When this occurs, the transceiver 12 transmits a comfort noise descriptor in the payload P of the next frame, which is used by the codec 21 to generate a "comfort noise" for generation by the earpiece 20 when there is no speech to be generated. The characterising data D1 for this frame indicates that the frame's payload is the comfort noise descriptor. This causes the codec 21 to generate the comfort noise for all subsequent frames until a frame is received whose characterising data D1 indicates its payload P is speech. "Comfort noise" descriptors may be repeated periodically until another speech-containing frame is received, so that the comfort noise generated can be updated, for example to reflect changing ambient levels at the transmission end.

Apart from the occasional update of the comfort noise descriptor, the payloads of most frames transmitted during such silent periods are available for other uses. In the three embodiments of the invention to be described, this spare payload capacity is used to carry a test signal.

Figure 3:
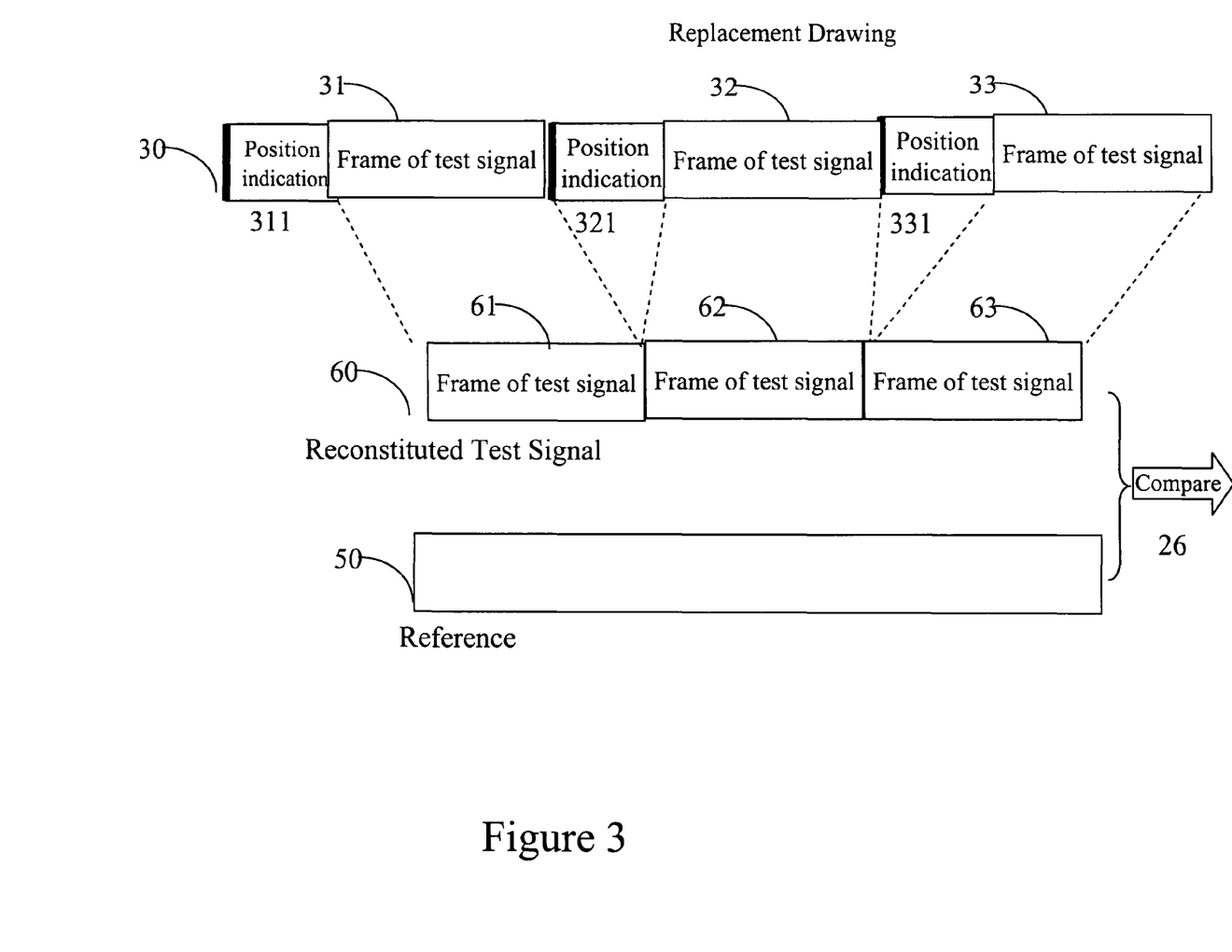
FIG. 3 illustrates diagrammatically the comparison process performed by one embodiment of the invention.

In the first embodiment the test signal generated by the assembler 15 is a precoded version of the test signal of the kind described in European Patent 0705501, retrieved from the memory 14. Such a signal provides an artificial voice signal having a range of sounds selected to be representative of a large range of speech-like sounds. The analysis processor 26 at the remote end compares the received signal 30 with a reference version 50 stored in the memory 24. It then determines the perceptual significance of errors introduced during transmission, taking account of their subjective significance and the relative frequencies of occurrence in normal speech of the individual sound elements in the test signal.

In order to test the system over the wide range of sounds capable of production by a human voice, a suitable test signal would be comparatively long compared to the gaps in speech detected by a voice activity detector. In this embodiment this problem is addressed by arranging that the assembler 15 transmits the test signal 30 frame-by-frame as spare frames become available. Each frame 31, 32, 33 has a characterising feature 311, 321, 331 indicative of its position in the sequence. The processor 25 at the receiver 2 then assembles the individual frames 31, 32, 33, into a complete (but degraded) copy of the test signal 60. It next passes the assembled signal 60 to the analysis unit 26 for comparison with a "clean" reference copy 50 of the signal retrieved from the memory 24, for example using the analysis process described in European Patent 0647375. The position identifying features 311, 321, 331 allow synchronisation of the two signals, and identification of any missing frames in the received test signal. Such missing frames are of course important elements of the degradation to be measured. However, their absence needs to be taken account of to ensure that subsequent frames are compared with their correct counterparts in the reference copy 50.

This embodiment requires the entire speech-like test signal to be stored in any transmitter 1 that may be used to test the link 3. This requires considerable memory capacity 14 in each such transmitter. Moreover, improvements to the speech-like test signal, or language-specific variants, (desirable because the relative significance of individual phonemes varies from one language to another), cannot be accommodated without reloading the revised test signal into the memory 14 of any such transmitter.

Figure 4:
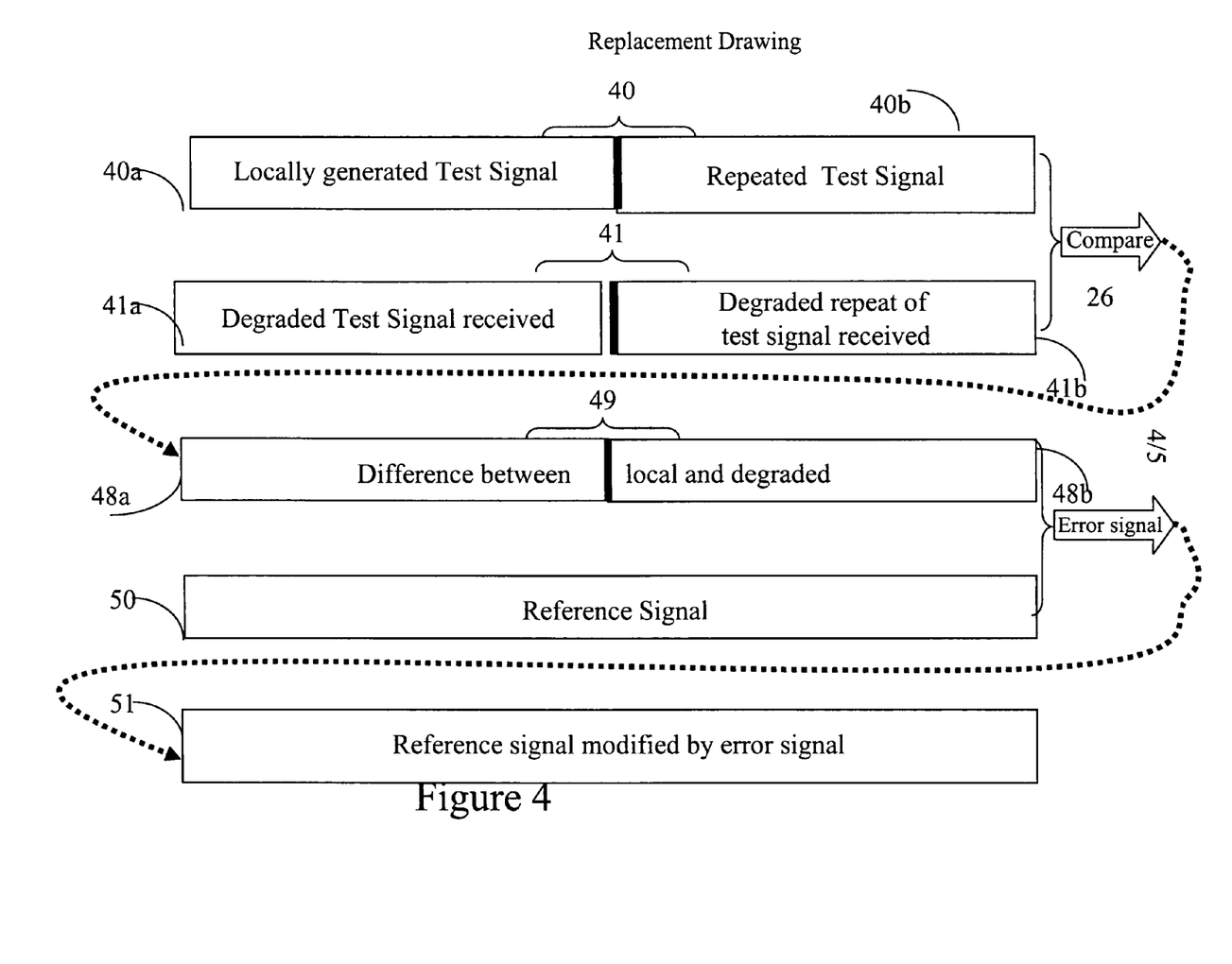
FIG. 4 illustrates diagrammatically the comparison process performed by a second embodiment of the invention.

The second embodiment of the invention overcomes this difficulty by using different bit sequences for the test and reference signals 40, 50, and using corruption of the test signal 40 to model similar corruption to the reference signal 50. The test bit sequence can therefore be much shorter, typically only one or a few frames, being repeated as many times as required (40a, 40b etc) to generate a test signal 40 of length to match the reference signal 50. The reference signal 50 can be the same as that used in the previous embodiment. The test bit sequence (40a) is not itself sufficiently long to model all possible distortions introduced by processes as digitisation, data compression, data reduction, amplification, and so on, in particular the performance of the codec 11. However, this embodiment is nevertheless suitable for testing the digital path 3, which is the part of the end-to end path (microphone 10 to earpiece 20) most likely to vary in quality, particularly in a cellular radio system.

The test bit sequence is repeatedly transmitted (40*a*, 40*b*) to generate the test signal 40 as payload during suitable gaps in the speech traffic. These transmissions are received by the transceiver 22 and passed to the processor 25, where a three-stage process is used to generate a correspondingly degraded version 51 of the reference signal 50, as shown illustratively in FIG. 4. In the first stage each degraded test bit sequence 41*a* received from the transceiver 22 is compared with a "clean" version 40*a* of the same sequence retrieved from the memory 24, to establish an error sequence 48*a*. Errors (that is to say, individual digital bits where the two sequences 40*a*, 41*a* do not correspond—a "1" in one sequence corresponding to a "0" in the other) are identified. Each iteration of the test sequence 40*a*, 40*b* generates a different error sequence 48*a*, 48*b*, and these error sequences are then assembled into an error signal 49 corresponding in length to the complete reference signal 50. A copy of the reference signal 50 is then retrieved from the store 24 and modified according to the error signal 49 to generate a modified reference signal 51. It should be noted that errors introduced in the modified reference signal 51 may be in the opposite sense to the corresponding error in the test signal 40. That is to say, if a "1" in the test signal 40 is corrupted to a "0", if the corresponding digital bit in the reference signal 50 is a "1" it becomes a "0" in the modified reference signal 51. However, if it is a "0" in the reference signal 50, it becomes a "1" in the modified reference signal 51.

The modified signal 51 is then compared with a further "clean" copy 50 of the reference signal using a perceptual analysis process of the kind described in European patent 0647375. This allows the perceptual significance of degradation of the path 3 to be measured without ever transmitting the full reference signal 50 over the link 3.

In the GSM enhanced full rate (EFR) speech service, there is no explicit field D1 to indicate the content of a frame. However, by ensuring that the test frames transmitted during periods of silence have incorrect checksum information D2, the codec at the receiver will ignore the incoming test frames. This is because the relevant GSM recommendation (GSM 06.81) specifies that during periods of comfort noise generation all frames received with an incorrect checksum shall be ignored. The analysis apparatus can nevertheless identify the test frames by comparing the Hamming distance of the received frame from a local copy of the transmitted frame.

The test frames may be used to assist in determining the location of a mobile station. A method for determining location is described in Annex B of GSM 03.71 v.8.0.0. This method is based on the time of arrival (TOA) of a known signal transmitted by a mobile station and received by three or more measurement units. The implementation described in GSM 03.71 requires the mobile network to generate the known signal by forcing the mobile station to perform an intra-cell handover and thus generate a sequence of known access bursts. This is undesirable, because each handover consumes system resources and can impact speech quality. In the present embodiment of the invention described above, the test frames themselves form a known bit sequence that can be used for TOA location measurements. Hence this embodiment can be used to repeatedly determine the location of a mobile station without the need to force intra-cell handovers, as well as the signal quality on the link between that location and each nearby fixed station.

Figure 5:
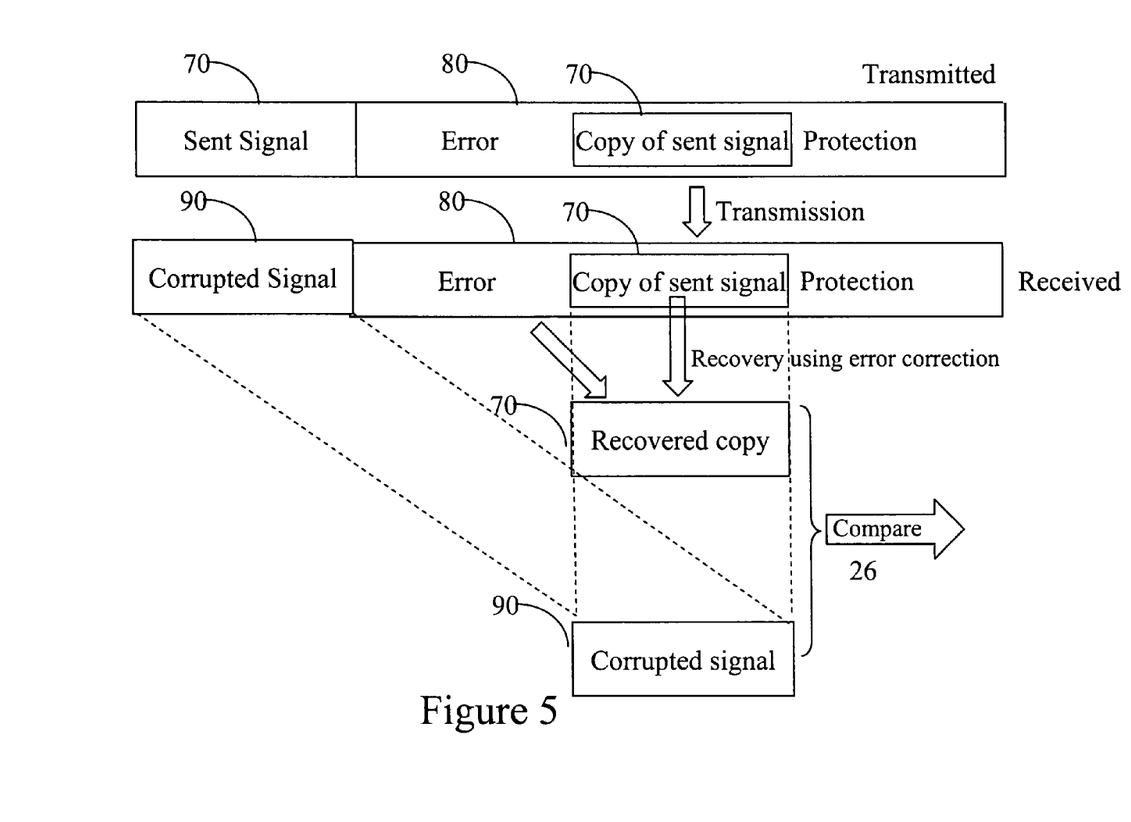
FIG. 5 illustrates diagrammatically the comparison process performed by a third embodiment of the invention.

In the third embodiment a sample 70 of the actual speech transmitted is used as both the test and reference signals. Part of the speech signal 70 transmitted by the transmitter 1 is also stored in a memory 14 in the transmitter. The relevant frames of the speech signal 70 are flagged in the characterising data D1 (FIG. 2). Using this characterising data, the receiving transceiver 22 identifies the corresponding frames 90 of the received signal and stores them in its memory 24 as well as processing them with the codec 21 for transmission to the earpiece in the usual way. These stored frames 90 will, of course, have been subjected to degradation by the link 3.

The assembler 15 now generates a heavily error-protected version of the signal portion 70 stored in the transmitter's memory 14. The error protection 80 is too slow to allow real-time transmission, being sufficiently robust to ensure that the original signal portion 70 can be reconstituted at the receiving end. Because of the large amount of error protection 80, only a sample of the total speech traffic can be used.

The error-protected version of the signal 70 is then transmitted over the link 3, during gaps in the speech as detected by the voice activity detector 13. The error-protected signal (70, 80) is received at the transceiver 22, and directed to the processor, which reconstitutes the original signal 70, and passes it to the analysis unit 26. The analysis unit retrieves the degraded version 90 of the same signal previously stored in the memory 24 and performs a perceptual analysis process on it as in the previous two embodiments, by comparing the re-constituted original signal 70 and the retrieved degraded signal 90. It should be noted that this process uses random segments (70, 90) of live speech, rather than the optimised test signals used in the other embodiments.

In an alternative arrangement, part of the corrupted signal may be error corrected and returned to its origin as the test signal, to be compared with a stored reference copy of the original signal. This allows the analysis to be carried out at the signal's origin instead of its destination, which may be useful, for example to allow a mobile telecommunications system to perform tests of the downlink (base station to mobile link). The transmitter of the test signal is therefore the receiver of the original signal, and vice versa.

It should be noted that the embodiments of FIGS. 3 and 4 may be used when the telephone 1 is in standby mode, that is, not currently engaged on a call, in order to test channels currently not in use. However, the embodiment of FIG. 5, because it uses live speech traffic, can only be used on a live channel.

In the embodiments described, the two elements that co-operate to perform the invention are a cellular telephone 1 and part of the fixed network 2, thereby allowing testing of part of the air interface uplink 3 (mobile to fixed). This is not to be taken as limitative—any two telecommunications elements 1, 2 may be used in a similar way to test the communications link 3 between them.

In some applications it may be desirable to measure the effect of link 3 on the end-to-end performance of the system under test. In this case, the generation of the modified signal 51 can include processing which replicates the effect of other components in the signal path, such as the codec 11.

The embodiments described above are configured for use in a time division system such as those operating according to the "GSM" mobile telephony standard. However, it may make use of spare capacity in any other system, for example in the code-division multiple access (CDMA or "Spread Spectrum") systems envisaged for "Third Generation"

mobile telephony. In such systems, all users use the same very broad frequency band, each user having a unique "chipping" code to allow the call traffic intended for that user to be extracted. The presence of other traffic is apparent as low level noise.

The transmission of test signals according to the invention during periods of spare capacity will slightly affect the characteristics of the system under test. In a GSM system the transmission of the test signals will increase the mean interference experienced by users in a distant cell using the same radio frequency. In a CDMA system, the transmission of the test signals will increase the interference experienced by users in the same cell. However, by carefully controlling the amount of time when test signals are transmitted, the impact on the overall system performance can be minimised.

What is claimed is:

1. A method of measuring a degree of degradation imposed on signals transmitted over a communications channel which is carrying a live call from a transmitter to a receiver, said method comprising:
    at the transmitter:
        generating a predetermined test signal having deliberately corrupted error checking data;
        identifying idle periods in voice activity on a live traffic channel during said live call in which no voice information content is required to be transmitted over the communications channel;
        in one or more of the identified idle periods, transmitting the predetermined test signal in one or more respective parts over the communications channel from the transmitter to the receiver;
    at the receiver:
        identifying the predetermined test signal by comparing a Hamming distance of the signal received from the transmitter with a locally-generated reference copy of the predetermined test signal;
        re-forming the predetermined test signal from the received parts,
        comparing the reformed predetermined test signal with the reference copy of the predetermined test signal; and
        generating therefrom a measure of signal degradation caused by the communications channel.

2. A method of measuring a degree of degradation imposed on signals transmitted over a communications channel which is carrying a live call from a transmitter to a receiver, said method comprising:
    at the transmitter:
        generating a predetermined test signal;
        identifying idle periods in voice activity on a live traffic channel during said live call in which no voice information content is required to be transmitted over the communications channel, the predetermined test signal being longer than the idle periods;
        in each of the identified idle periods, transmitting a part of the predetermined test signal over the communications channel from the transmitter to the receiver;
    at the receiver:
        re-forming the test signal by assembling a complete version of the predetermined test signal from the parts of the test signal received from the transmitter;
        generating a reference signal at the receiver;
        comparing the reformed predetermined test signal with the reference signal; and
        generating therefrom a measure of signal degradation caused by the communications channel.

3. A method of measuring a degree of degradation imposed on signals transmitted over a communications channel which is carrying a live call from a transmitter to a receiver, said method comprising:
    at the transmitter:
        identifying idle periods in voice activity on a live traffic channel during said live call in which no voice information content is required to be transmitted over the communications channel;
        generating a predetermined test sequence for repeated transmission over the communications channel in each idle period;
    at the receiver:
        receiving the transmission including the repeated test sequence;
        comparing each of resulting series of degraded test sequences with an undegraded reference version of the test sequence to identify bit errors in the degraded test sequences,
        generating a reference signal,
        reproducing said bit errors in a copy of the reference signal to generate a degraded version of the reference signal,
        performing an analysis of perceptual significance of differences between the degraded and original versions of the reference signal; and
        generating therefrom a measure of signal degradation caused by the communications channel.

4. A method of measuring a degree of degradation imposed on voice signals transmitted over a communications channel which is carrying a live voice call from a transmitter to a receiver, said method comprising:
    at the transmitter:
        transmitting an information-bearing signal;
        generating a reference signal, the reference signal being an error protected version part of the information-bearing signal;
        identifying idle periods in voice activity on a live voice traffic channel during said live voice call in which no voice information content is required to be transmitted over the communications channel;
        transmitting the reference signal in one or more of the identified idle periods of the communications channel;
    at the receiver:
        re-forming the reference signal from the one or more parts of the signal received from the transmitter;
        identifying the part of the information-bearing signal corresponding to the reference signal;
        comparing the reformed reference signal with the corresponding part of the information-bearing signal;
        generating therefrom a measure of degradation of the voice signals caused by the communications channel.

5. A method according to claim 4, in which the reference signal is generated from a signal before transmission, and is compared with a degraded version of the information bearing signal received after transmission.

6. Telecommunications apparatus comprising:
    a transmitter for transmitting a live call to a receiver over a communications channel;
    an activity detector for identifying idle periods on the communications channel in which no information content is required to be transmitted;
    a signal generator for generating a predetermined test signal longer than the idle periods;
    wherein the transmitter is arranged to transmit part of the predetermined test signal in each of plural idle periods detected by the activity detector in order to allow the receiver to measure a degree of degradation imposed on the transmitted signal.

7. Telecommunications apparatus comprising:
a transmitter for transmitting a live call to a receiver over a communications channel an activity detector for identifying idle periods in which no information content is required to be transmitted over the communications channel; and
a signal generator for generating a predetermined test signal with deliberately corrupted error checking data;
wherein said transmitter transmits the predetermined test signal in one or more parts over the communications channel to the receiver using one or more of said idle periods in order to allow the receiver to measure a degree of degradation imposed on the transmitted signal.

8. Telecommunications apparatus comprising:
a transmitter for transmitting a live voice call to a receiver over a voice communications channel;
a voice activity detector for identifying idle periods in voice activity in content of the live voice call and
a signal generator for generating a test signal comprising an error-protected version of part of the live voice call transmission, and
wherein said transmitter is arranged to transmit at least part of the said error-protected version over the voice communications channel to the receiver during each idle period, in order to allow the receiver to compare the error protected version with the live transmission.

9. Telecommunications apparatus for measuring a degree of degradation imposed on signals received from a transmitter over a communications channel which is carrying a live call from the transmitter, the apparatus comprising:
a receiver for receiving a transmission from the transmitter;
means for identifying idle periods in a transmission received by the receiver, in which no information content is being transmitted over the live communications channel;
a processor for extracting a degraded test signal received over the communications channel using such idle periods, the test signal being identified by comparing a Hamming distance between the received degraded test signal and a locally stored copy of the test signal;
reference signal generation means for generating a reference signal;
analysis means for comparing the degraded test signal with the reference signal.

10. Telecommunications apparatus for measuring a degree of degradation imposed on signals received from a transmitter over a communications channel which is carrying a live call from the transmitter, the apparatus comprising:
a receiver for receiving a transmission from the transmitter;
means for identifying idle periods in the received transmission, in which no information content is being transmitted over the live communications channel;
a processor means for extracting a degraded test signal received over the communications channel using such idle periods, by assembling a complete version of the degraded test signal from individual parts of the degraded test signal each received in a respective one of the idle periods,
reference signal generation means for generating a reference signal;
analysis means for comparing the assembled complete version of the degraded test signal with the reference signal.

11. Telecommunications apparatus for measuring a degree of degradation imposed on signals received from a transmitter over a communications channel which is carrying a live call from the transmitter, the apparatus comprising:
a receiver for receiving a transmission from the transmitter;
means for identifying idle periods in a received transmission from the transmitter, in which no information content is being transmitted over the live communications channel;
a processor for extracting a a predetermined test sequence from each idle period, the sequence being repeated in each of plural idle periods;
a first comparison means arranged to identify degradations in each received test sequence by comparison with an undegraded version of the test sequence to identify bit errors in the degraded test sequences,
reference signal generation means for generating two copies of a reference signal;
reproduction means to reproduce said bit errors in one copy of the reference signal to generate a degraded version of the reference signal, and
second comparison means to analyse perceptual significance of differences between the degraded reference signal and the undegraded version of the reference signal.

12. Telecommunications apparatus for measuring a degree of degradation imposed on signals received from a transmitter over a communications channel which is carrying a live call from the transmitter, the apparatus comprising:
a receiver for receiving a transmission from the transmitter
means for identifying idle periods in a transmission received by the receiver, in which no live information content is being transmitted over the live communications channel;
a processor for extracting an error protected version of part of the information-containing part of the transmission received over the communications channel during such idle periods;
storage means to store a corresponding part of the live transmission;
analysis means for comparing the stored signal with the error-protected version.

13. A method of measuring the degree of degradation imposed on voice signals transmitted over a communications channel which is carrying a live voice call between an origin and a destination, said method comprising:
at the origin:
transmitting an information-bearing signal,
at the destination:
receiving the information-bearing signal, degraded by the communications channel;
generating a reference signal, the reference signal being an error-protected version of part of the received information-bearing signal,
identifying idle periods in voice activity during said live voice calling which no information content is required to be transmitted over the communications channel,
transmitting said reference signal in one or more of the identified idle periods of the communications channel from the receiver back to the origin;
at the origin:
re-forming the reference signal from the one or more parts of the signal received from the destination,
comparing the reference signal with a copy of the signal originally transmitted.

* * * * *